United States Patent Office 3,265,760
Patented August 9, 1966

3,265,760
POLYMER BLENDS OF ACRYLOXY PHENONES
Stanley Tocker, Wilmington, Del., assignor to E. I. du Pont de Nemours and Company, Wilmington, Del., a corporation of Delaware
No Drawing. Filed Mar. 14, 1962, Ser. No. 179,766
22 Claims. (Cl. 260—836)

This invention relates to organic polymeric structures and, particularly, to shaped articles such as polymeric films suitable for outdoor use.

This application is a continuation-in-part of my co-pending application Serial No. 54,841 filed September 9, 1960, now abandoned.

Many organic polymeric structures, such as structures of polyethylene, polypropylene, poly(vinylidene chloride) and the like deteriorate rapidly when subjected to sunlight. The materials are sensitive to light in the ultraviolet range, particularly in the wavelength range of 2900–3800 A. Exposure to the ultraviolet light tends to embrittle the structures and reduce the level of their electrical and physical properties substantially. Some polymers acquire an undesirable color upon exposure to ultraviolet light.

The object of the present invention is to provide novel ultraviolet light absorbent compounds useful in preparing weather-resistant organic polymeric shaped articles, particularly self-supporting films, suitable for outdoor use. It is a further object to provide a process for preparing such compounds. Other objects will appear hereinafter.

The objects are accomplished by a composition comprising a homopolymer of a monomer selected from the group consisting of:

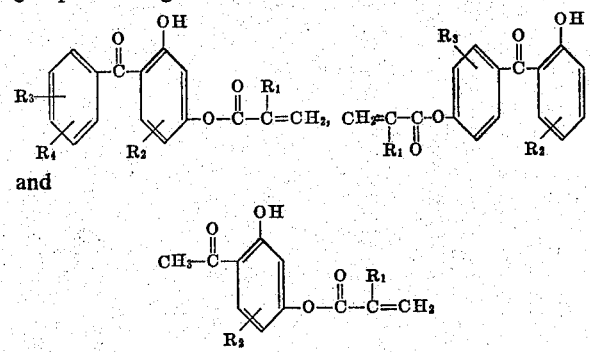

and wherein $R_1$ is selected from the group consisting of hydrogen and alkyl having 1–3 carbon atoms, and $R_2$, $R_3$ and $R_4$ are each selected from the group consisting of hydrogen, halogen, alkyl and alkoxy, preferably having an inherent viscosity of at least 0.3.

The homopolymer may be used in the form of a coating on an ultraviolet light vulnerable shaped polymeric article or as part of a blend with the degradable polymer. Among the relatively light degradable polymers that can be used as the shaped article or as a blend with the homopolymers of the invention are polyesters, epoxy resins and polymers of at least one unsaturated compound having the structural formula:

wherein $R_5$ is selected from the group consisting of hydrogen, halogen and alkyl having 1–4 carbon atoms, and $R_6$ is selected from the group consisting of hydrogen, halogen, alkyl of 1–4 carbon atoms, carboalkoxy, carboaryloxy, phenyl, acetoxy, acetyl and cyano.

Thus, shaped articles of polymers (homopolymers and copolymers) of ethylene, propylene, butene-1, pentene-1, hexene-1, vinyl chloride, vinyl fluoride, vinylidene chloride, methyl, ethyl, butyl, octyl, ethylhexyl, cyclohexyl and phenyl acrylates and methacrylates, vinyl acetate, vinyl propionate, acrylonitrile, polyethylene terephthalate, etc., can be coated with homopolymers of the invention.

The homopolymer coating may be applied to the shaped articles from a solution of the homopolymer in a solvent such as ethyl acetate, dioxane, acetone, toluene, benzene, etc., or a dispersion of the homopolymer in water or in a solvent. Coating may be accomplished by a dipping process, a brushing process or a spraying process. It is also possible in some cases to melt press the homopolymer on the polymeric shaped article. In order to achieve effective protection from ultraviolet light, the ultimate homopolymeric coating should have a thickness of at least 01. mil. Although the coating can be thicker, it is undesirable from an economic standpoint to use coating thicknesses greater than about 2 mils. For most substrates, the homopolymeric coating need not be any thicker than 0.5 mil.

When used in a blend, it is desirable to incorporate 0.5–20% by weight of the homopolymer of the invention into the thermoplastic polymeric resin prior to using the resin either as a coating or a shaped article such as a self-supporting film, a filament, a tube, a rod, and the like or as an adhesive. The incorporation process may be accomplished by any of the conventional procedures known to those in the art such as milling or wet blending (dissolving the polymers in a common solvent).

Although incorporation of the homopolymers of this invention with thermoplastic polymeric resins provides some improvement for all the polymers enumerated previously, the blending procedure is particularly effective with polymers having polar bonds. Such polymers include the acrylate and the methacrylate polymers, vinyl acetate polymers, vinyl chloride polymers, vinyl fluoride polymers, vinylidene chloride polymers, polyesters and epoxy resins.

Of particular interest is the blending of the homopolymers of the invention with adhesive polymeric resins such as the acrylic, epoxy and polyester adhesive resins. The adhesive resins containing the homopolymers of the invention may then be used as a coating or in a laminate. When used in a laminate, the adhesive containing the homopolymer of the invention will tend to protect the substrate but more important the adhesive itself will be resistant to ultraviolet light and, thus, provide a weatherable bond that maintains the laminate for extended periods. Among the polyester-based adhesives which are benefited by the incorporation of the novel homopolymers are those polyester and copolyester compositions disclosed in U.S. Patents Nos. 2,765,251, 2,623,033, 2,698,239 and 2,698,241 which are usually obtained by reacting a slight stoichiometric excess of ethylene glycol with dimethyl esters of terephthalic sebacic, isophthalic, and/or adipic acids. Among the acrylic adhesives which may be used with the homopolymers are those disclosed in U.S. Patents Nos. 2,464,826 and 2,949,445. The epoxy adhesives which are benefited by incorporating the homopolymers of the invention include those that are prepared by reaction of epichlorohydrin and bisphenol A and sold under the names "Epon" 1004[1], 1007[1], 1009[1] and Bonding Agent R-313[2].

---
[1] Manufactured by Shell Chemical Company.
[2] Manufactured by C. H. Briggs Company.

It should also be understood that the homopolymers of the invention may be used alone as the the basis for shaped articles that are resistant to degradation by ultraviolet light. These homopolymers may be extruded at elevated temperatures in the form of self-supporting films, filaments, rods, tubes, etc. Alternatively, the homopolymers may be cast from solutions in certain solvents such as ethyl acetate, methyl ethyl ketone, benzene, toluene, etc., in the form of a shaped article.

In all cases, the homopolymers may be used along with pigments, fillers, heat stabilizers, plasticizers, or other ultraviolet light absorbers if desired as long as these additives do not detract from the effectiveness of the polymers.

The process for preparing the homopolymers involves first preparing the acrylic ester monomer from a dihydroxybenzophenone or acetophenone and an acrylic halide. The resulting monomer, which is preferably of the following group, is then polymerized. The preferred group includes 2-hydroxy-4-methacryloxybenzophenone,
2-hydroxy-4-acryloxybenzophenone,
2-hydroxy-4-methacryloxyacetophenone,
2-hydroxy-4-acryloxyacetophenone,
2-hydroxy-4'-methacryloxybenzophenone,
2-hydroxy-4'-acryloxybenzophenone,
2 - hydroxy - 4 - methacryloxy - 5 - tertiary - butylbenzophenone and
2-hydroxy-4-methacryloxy - 2',4' - dichlorobenzophenone.

Other useful monomers that may be used for forming a homopolymer include:

2-hydroxy-4-ethacryloxybenzophenone,
2-hydroxy-3-chloro-4-methacryloxybenzophenone,
2-hydroxy-4-methacryloxy-6-methoxybenzophenone,
2-hydroxy-4-methacryloxy-3'-methylbenzophenone,
2-hydroxy-4-acryloxy-3'-ethoxybenzophenone and the like,
2-hydroxy-4-ethacryloxyacetophenone,
2-hydroxy-3-chloro-4-methacryloxyacetophenone,
2-hydroxy-4-methacryloxy-6-methoxyacetophenone,
2-hydroxy-4-methacryloxy-5-methylacetophenone,
2-hydroxy-4'-ethacryloxybenzophenone,
2-hydroxy-3-chloro-4'-methacryloxybenzophenone,
2-hydroxy-4-methyl-4'-methacryloxybenzophenone,
2-hydroxy-5-methoxy-4'-methacryloxybenzophenone,
2-hydroxy-2'-chloro-4'-methacryloxybenzophenone,
2-hydroxy-3'-ethyl-4'-methacryloxybenzophenone,
2-hydroxy-4'-methacryloxy-5'-ethoxybenzophenone and the like.

Polymerization involves subjecting the monomer in a nonpolar or aromatic solvent such as a liquid hydrocarbon solvent such as hexane, benzene, cyclohexane and the like, to a temperature of —40° to 300° C. and a pressure of 1–3000 atmospheres in the presence of a catalyst for a contact time sufficient to form the homopolymer, usually at least 20 second for a continuous process and at least 3 minutes for a batch process, and then isolating the resulting homopolymer. The useful catalyst is an azo catalyst and the temperature is preferably 25°–175° C. The azo catalysts for initiation of polymerization include alpha, alpha'-azobisdicyclohexanecarbonitrile; alpha, alpha'azo-bisisobutyronitrile; triphenylmethylazobenzene; 1,1'-azodicycloheptanecarbonitrile; alpha, alpha'-azobisisobutyramide; lithium azodisulfonate; magnesium azodisulfonate; dimethyl alpha, alpha'-azodiisobutyrate; alpha, alpha'-azobis(alpha, gamma-dimethylvaleronitrile) and alpha, alpha'-azobis(alpha, beta-dimethylbutyronitrile).

As mentioned previously, polymerization is preferably carried out in a nonpolar solvent medium. Among the solvents which have been found useful in the present invention are the hydrocarbons: n-hexane, benzene, cyclohexane, n-octane, n-decane and heterocyclic compounds such as dioxane, as well as carbon tetrachloride and paraxylene. The specific concentration of the monomer in the solvent is critical for obtaining useful homopolymers. Thus, soluble linear homopolymers are obtained at concentrations of 2 to 20% by weight of the monomer in the solvent.

The polymer product, in its preferred form is a substantially linear homopolymer having pendant groups of the formula:

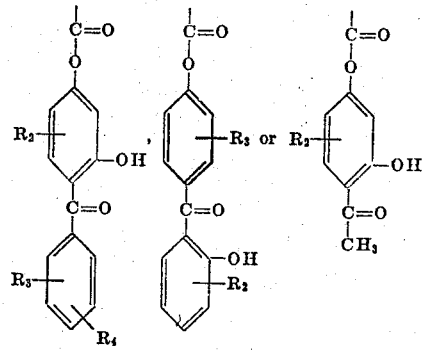

wherein $R_2$, $R_3$ and $R_4$ are each selected from the group consisting of hydrogen, halogen, alkyl and alkoxy, the homopolymer having an inherent viscosity of at least 0.3.

The determination of the structure is accomplished by infrared spectral techniques [3] known to those skilled in the art. The infrared spectra may be taken on pressed films by the use of a Perkin-Elmer Model 21 Spectrophotometer and a Perkin-Elmer Infracord Spectrophotometer.

Measurements of ultraviolet light absorption are carried out in accordance with procedures described in "Analytical Chemistry" by C. R. N. Strouts, J. H. Gilfillan and H. N. Wilson, volume II, Chapter 22, Oxford University Press, 1955.

Inherent viscosity which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

The invention will be more clearly understood by referring to the examples which follow, Example 1 representing the best mode contemplated for practicing the invention. It is understood that the examples, although illustrating specific embodiments of the present invention, should not be considered limitative of the invention.

*Examples 1 and 2*

A mixture of 10.0 grams of 2,4-dihydroxybenzophenone and 5.0 grams of methacrylyl chloride was treated with 20 ml. of anhydrous pyridine with stirring. After 15 minutes, the resultant mixture was heated in a water bath at 70–80° C. for 5 minutes. The reactor was then cooled and the contents were poured into 600 ml. of 3% aqueous hydrochloric acid containing 100 grams of crushed ice. As soon as possible the aqueous mixture was extracted with ether, the ether phase was dried over anhydrous sodium sulfate, and the ether was removed in a vacuum oven at 40–50° C. The resultant product was recrystallized from ethanol containing 15% water, yielding 11.1 grams of pale yellow crystals having a melting point of 76° C.

---

[3] W. M. D. Bryant and R. C. Voter, Journal of American Chemical Society, 75, 6113 (1953).
F. W. Billmeyer, "Textbook of Polymer Chemistry," chapter 7, Interscience Publishers, 1957.

Infrared analysis showed the presence of ester absorption at 1725 cm.$^{-1}$ and bonded carbonyl at 1650 cm.$^{-1}$ indicating clearly that esterification had taken place on the 4-hydroxyl position. Ultraviolet analysis showed strong maxima at 3400–3500 A. indicative of o-hydroxybenzophenones. Also, infrared absorption characteristic of phenolic hydroxyl absorption in the region of 1050–1300 cm.$^{-1}$ was considerably less than that found for the unesterified starting material, 2,4-dihydroxybenzophenone, which is further indication of esterification.

The chemical analysis was: carbon, 72.35%; hydrogen, 5.18% (calculated for $C_{17}H_{14}O_4$: carbon, 72.33%; hydrogen, 5.00%). The product was 2-hydroxy-4-methacryloxybenzophenone.

Homopolymerization was accomplished by introducing 2 grams of the monomer, 50 ml. of benzene and 0.2 gram of $\alpha,\alpha'$-azodicyclohexanecarbonitrile into an autoclave previously flushed with nitrogen. This mixture was heated for two hours at a temperature of 115–120° C., during which period an atmosphere of nitrogen was maintained. A portion of the reaction mixture was cooled to room temperature and used directly for coating the substrate as described below. The remainder of the reaction mixture was placed in a vacuum oven at 50° C. where the solvent was evaporated. The inherent viscosity of the solid product remaining was measured on a solution of 0.1 gram of the polymer in 100 ml. of alpha-chloronaphthalene at 125° C. and found to be 0.36.

A 4-mil thick sheet of polyethylene film was prepared in the conventional manner from "Alathon" 10 polyethylene resin and treated to improve its adherability by the process described in U.S. Patent 2,715,076. The film was coated with the above prepared solution of the homopolymer. The solvent was evaporated by heating the coated film in an oven at 50° C. leaving a coating 0.25 mil thick of the ultraviolet light stabilizing homopolymer.

When exposed to the action of a bank of Westinghouse F–S 20–T–12 sunlamps, the coated film showed no evidence of cracking after 2,000 hours of such exposure. A control uncoated polyethylene film cracked when flexed after only 300 hours' exposure.

In Example 2, 1 percent by weight of the above homopolymer was blended with the "Alathon" 10 polyethylene resin prior to forming a 4-mil thick film. The resulting film withstood 800 hours of exposure to the bank of Westinghouse sunlamps.

*Examples 3 and 4*

A solution of 10 grams of 2,4-dihydroxybenzophenone in 60 ml. of water containing 2.4 grams of sodium hydroxide was treated dropwise under vigorous stirring with 4.5 grams of acrylyl chloride. After addition was completed, stirring was continued for 30 minutes. The resultant solid material was filtered and dissolved in 250 ml. of ethanol. This solution was filtered and then allowed to stand for 12 hours at 0° C. The resultant pale yellow crystals which separated were filtered and recrystallized from ethanol. A yield of dried product was 8.1 grams with a melting point of 80–81° C.

An ultraviolet analysis of this material dissolved in carbon tetrachloride showed strong maxima in the spectral region of 3400–3500 A., indicative of o-hydroxybenzophenones. Infrared absorption at 1725 cm.$^{-1}$ was obtained which is characteristic of ester groups. These data indicate that the esterification had taken place on the 4-hydroxy group of the 2,4-dihydroxybenzophenone.

The chemical analysis was: carbon, 72.47%; hydrogen, 4.57% (calculated for $C_{16}H_{14}O_2$: carbon, 71.63%; hydrogen, 4.51%). The product was 2-hydroxy-4-acryloxybenzophenone.

The product so prepared was homopolymerized substantially in the manner described in Example 1 to form poly(2-hydroxy-4-acryloxybenzophenone) having an inherent viscosity of 0.35. The homopolymer in a solution of toluene was coated on a polyethylene film to form, after evaporation of the solvent, an 0.5-mil thick coating. The coated film withstood 1800 hours of exposure to the bank of Westinghouse sunlamps; whereas the uncoated polyethylene film failed after only 300 hours of exposure.

In Example 4, 1 percent by weight of the homopolymer was blended with polyethylene resin prior to forming a 5-mil thick film. The resulting film withstood 900 hours of exposure to the bank of Westinghouse sunlamps.

*Examples 5 and 6*

To a mixture of 27.6 grams of resorcinol dimethyl ether and 42 grams of 2,4-dichlorobenzoyl chloride dissolved in 300 grams of 1,1,2,2-tetrachloroethane maintained below 15° C., there was added slowly with stirring 54 grams of anhydrous aluminum chloride. The resulting mixture was then heated gradually with stirring to 90–95° C. and held at that temperature until there was no further evolution of hydrogen chloride. The reaction mixture was then cooled to 10° C. and there was then added slowly 250 grams of a 10% hydrochloric acid solution. The solvent layer was separated and washed with additional quantities of dilute hydrochloric acid and water. Finally, the layer was washed with ammonium hydroxide solution until it was free of acidic material. The solvent was removed by distillation under reduced pressure and the residue was recrystallized from ethanol to give 2,4-dihydroxy-2',4'-dichlorobenzophenone.

A mixture of 11 grams of the 2,4-dihydroxy-2',4'-dichlorobenzophenone and 5.0 grams of methacrylyl chloride was treated with 20 ml. of anhydrous pyridine with stirring. After fifteen minutes the resultant mixture was heated in a water bath at 70–80° C. for five minutes. The reactor was then cooled and the contents were poured into 600 ml. of 3% aqueous hydrochloric acid containing 100 grams of crushed ice. As soon as possible the aqueous mixture was extracted with ether, the ether phase was dried over anhydrous sodium sulfate, and the ether was removed in a vacuum oven at 40–50° C. The resultant product was recrystallized from ethanol yielding 12 grams of pale yellow crystals of 2-hydroxy-4-methacryloxy-2',4'-dichlorobenzophenone.

Poly(2-hydroxy-4-methacryloxy-2',4'-dichlorobenzophenone), having an inherent viscosity of 0.39, was prepared substantially in the manner described for Example 1. This homopolymer as a solution in toluene was coated on a polyvinyl chloride film to form, after evaporation of the solvent, an 0.3-mil thick coating. The coated film withstood 1000 hours of exposure to the bank of Westinghouse sunlamps; whereas an uncoated polyvinyl chloride film failed after only 280 hours of exposure.

In Example 6, 1 percent by weight of the homopolymer was blended with polyvinyl chloride resin prior to forming a 5-mil thick film. The resulting film withstood 800 hours of exposure to the bank of Westinghouse sunlamps.

*Examples 7 and 8*

A solution of 20 grams of polyvinyl acetate and 1 gram of poly(2-hydroxy-4-methacryloxybenzophenone) in 150 ml. of toluene was coated on paper and allowed to dry in an oven at 50° C. The coated paper was exposed to a bank of Westinghouse F–S sunlamps along with two controls, control A consisting of uncoated paper and control B consisting of polyvinyl acetate alone coated on paper. After one week of exposure, both controls were yellow and cracked; the paper coated with the polyvinyl acetate-polymeric ultraviolet absorber blend showed no tendency to yellow and the glossy coating remained intact.

Similarly in Example 8, an ethylene-vinyl acetate copolymer (27 weight percent vinyl acetate) was blended with poly(2-hydroxy-4-methacryloxybenzophenone) and used as a coating on paper as described for Example 7. This blend, likewise, protected paper from ultraviolet degradation.

Example 9

A solution of 20 grams of polyvinyl chloride and 1 gram of poly(2-hydroxy-4-acryloxybenzophenone) in 75 ml. of dioxane was cast onto a glass plate. The plate was dried at 30–40° C. in an oven. A transparent 4-mil film of the blend was deposited on the glass. This was stripped off the glass and the physical test properties were similar to those of a polyvinyl chloride control film. The blend film survived over 600 hours' exposure to a bank of Westinghouse F–S sunlamps; the polyvinyl chloride control film yellowed and cracked in less than 200 hours' exposure.

Examples 10 and 11

A mixture of 7.6 grams of 2,4-dihydroxyacetophenone and 5.0 grams of methacrylyl chloride was treated with 20 ml. of anhydrous pyridine with stirring. After 15 minutes the resultant mixture was heated in a water bath at 70–80° C. for 5 minutes, after which the reactor was cooled and the contents were poured into 600 ml. of 3% aqueous hydrochloric acid containing 100 grams of crushed ice. The aqueous mixture was extracted with ether, the ether extract was dried over anhydrous sodium sulfate and the ether was then removed in a vacuum oven at 40–50° C. The oily product showed an infrared absorption band at 1725 cm.$^{-1}$, characteristic of an ester group and a band at 1650 cm.$^{-1}$, characteristic of bonded carbonyl. Ultraviolet analysis of this material dissolved in carbon tetrachloride showed strong maxima in the spectral region 3100–3300 A., indicative of o-hydroxyacetophenones. These data indicate that esterification had taken place on the 4-hydroxyl group of the 2,4-dihydroxyacetophenone.

Homopolymerization was accomplished in the manner described for Example 1 using α,α'-azobisisobutyronitrile as the catalyst and a temperature of 95° C. The inherent viscosity of the poly(2-hydroxy-4-methacryloxyacetophenone) was measured on a solution of 0.1 gram of the polymer in 100 ml. of alpha-chloronaphthalene at 125° C. and found to be 0.4.

A polyvinyl chloride film was coated with the solution of the homopolymer in toluene. The solvent was evaporated by heating the coated film in an oven at 50° C. leaving a coating 0.25 mil thick of the ultraviolet light stabilizing homopolymer.

When exposed to the action of a bank of Westinghouse F–S 20–T–12 sunlamps, the coated film showed no evidence of cracking after 800 hours of such exposure. A control uncoated polyvinyl chloride film cracked when flexed after only 280 hours' exposure.

In Example 11, 1 percent by weight of the homopolymer was blended with polyvinyl chloride resin prior to forming a 5-mil thick film. The resulting film withstood 800 hours of exposure to the bank of Westinghouse sunlamps.

Examples 12–16

*Preparation of 2-hydroxy-4-acryloxyacetophenone.*— A solution of 7.6 grams of 2,4-dihydroxyacetophenone in 60 ml. of water containing 2.4 grams of sodium hydroxide was treated dropwise under vigorous stirring with 4.5 grams of acrylyl chloride. After addition was completed, stirring was continued for 30 minutes. An oil was liberated which was extracted with ether. The ether solution was dried over anhydrous sodium sulfate, and ether was stripped in a vacuum oven at 50° C. leaving 7.2 grams of colorless oil. An ultraviolet analysis of this material dissolved in carbon tetrachloride showed strong maxima in the spectral region of 3100–3300 A., indicative of o-hydroxyacetophenones. Infrared absorption at 1725 cm.$^{-1}$ was obtained which is characteristic of ester groups. These data indicate that the esterification had taken place on the 4-hydroxy group of the 2,4-dihydroxyacetophenone.

*Preparation of 2-hydroxy-4'-methacryloxybenzophenone.*—2,4'-dihydroxybenzophenone (10 grams) was reacted with 5.5 methacrylchloride in the same manner as described in the previous paragraph except that 2.5 grams sodium hydroxide was required. The resultant light yellow solid in carbon tetrachloride showed an ultraviolet absorption maxima at 3500 A., characteristic of ortho-hydroxybenzophenones. This indicated that esterification had taken place in the 4' position and that the desired product was obtained.

*Preparation of 2-hydroxy-4'-acryloxybenzophenone.*—2,4'-dihydroxybenzophenone (10 grams) was reacted with 2.5 grams sodium hydroxide and 5.0 grams acrylyl chloride in the same manner as described above. The resultant light yellow solid was recrystallized from ethanol yielding 8.7 grams of 2-hydroxy-4'-acryloxybenzophenone.

Preparation of 2-hydroxy-4-methacryloxy-5-tertiary-butylbenzophenone was identical to that shown in Example 1 except for the use of 2,4-dihydroxy-5-tertiary-butylbenzophenone instead of 2,4-dihydroxybenzophenone.

Homopolymers of the above monomers were prepared following the procedure described in Example 1 using the catalyst shown in the table. In each case, the homopolymer was coated to a thickness of about 0.3 mil on a base film and was also blended with the resin of the base film to an extent of about 1% by weight. The coated films and those formed from the blends were then exposed to ultraviolet light. In every case, the films having a homopolymer of the invention as a coating or in a blend survived without cracking upon flexing for periods ranging from 3 to 10 times the periods survived by the corresponding uncoated, unadulterated base film. The base film, the novel homopolymer, its inherent viscosity and the catalyst used in its preparation are presented in Table I.

TABLE I

| Example | Base Film | Homopolymer of Invention | Catalyst | Inherent Viscosity |
|---|---|---|---|---|
| 12 | Polyethylene | Poly(2-hydroxy-4-acryloxyacetophenone). | Alpha,alpha'-azobis-(alpha,gamma-dimethylvaleronitrile) | 0.4 |
| 13 | Poly(vinylidene chloride). | Poly(2-hydroxy-4'-methacryloxybenzophenone). | ___do___ | 0.39 |
| 14 | Polypropylene | Poly(2-hydroxy-4'-acryloxybenzophenone). | Alpha,alpha'-azobis-isobutyramide. | 0.42 |
| 15 | Polybutyl Acrylate. | Poly(2-hydroxy-4-methacryloxy-5-tertiary-butyl-benzophenone). | Alpha,alpha'-azobis-dicyclohexanecarbonitrile. | 0.31 |
| 16 | Polystyrene | Poly(2-hydroxy-4-methacryloxy-benzophenone). | Triphenylmethane-azobenzene. | 0.38 |

Example 17

To a solution of Eastman 910 methyl cyanoacrylate adhesive there was added 1% by weight of the adhesive solids of the polymer of 2-hydroxy-4-methacryloxybenzophenone prepared as described in Example 1. This adhesive solution was then used to fasten a strip of rubber to a chromium plated steel substrate. After 12 months' outdoor exposure the rubber strip remained firmly adhered to the substrate; a similar adhesive bond made on a rubber strip attached with the same adhesive but without the added ultraviolet light stabilizer was no longer intact at the end of the time.

Example 18

To a solution of 17 parts by weight of a 60/40 weight ratio ethylene terephthalate/ethylene sebacate copolyester (prepared as described in U.S. Patents Nos. 2,623,031 and 2,623,033) in 83 parts by weight of carbon tetrachloride then was added 1% by weight of the copolyester solids of poly(2-hydroxy-4-acryloxybenzophenone). A thin layer of this adhesive composition was brushed on one surface of each of two 3-mil thick sheets of polymeric linear terephthalate film. The solvent was evaporated and the adhesive coated sheets were pressed together with a pressure of 500 pounds per square inch at 90° C. for 5 minutes. The adhered laminate was then exposed to a bank of ultraviolet sunlamps for 500 hours. At the end of this time the sheets were still firmly adhered; whereas a control laminate adhered with the same adhesive which did not have the added light stabilizer showed almost no adhesion under the same treatment.

Example 19

To a solution of "Epon" 1007 adhesive obtained from Shell Chemical Company there was added 1% by weight of adhesive solids of the polymer of 2-hydroxy-4-methacryloxyacetophenone. A thin layer of this adhesive composition was brushed on one surface of each of two sheets of tetrafluoroethylene/hexafluoropropylene copolymer film which had previously been treated in an electrical discharge in an atmosphere of nitrogen and the vapor of glycidyl methacrylate. The surfaces bearing the adhesive were pressed together for 20 minutes at 70° C. at a pressure of 75 pounds per square inch. The laminate was then exposed to a bank of ultraviolet sunlamps for 1000 hours. At the end of this time the laminate showed no impairment in bonding strength of the adhesive. A control laminate made with the same adhesive which did not contain the light stabilizer showed a reduction in bond strength of about 30% after the same period.

Example 20

Homopolymerization of 2-hydroxy-4-methacryloxybenzophenone was carried out by introducing 1000 grams of the monomer, 1800 ml. of a solvent consisting of 580 ml. of isopropanol and 1220 ml. of toluene and 2.0 grams of $\alpha,\alpha'$-azobisisobutyronitrile into an autoclave previously flushed with nitrogen. This mixture was heated for 2 hours at reflux during which period an atmosphere of nitrogen was maintained. The reaction mixture was cooled to room temperature and then was placed in a vacuum oven at 50° C. where the solvent was evaporated. The inherent viscosity of the solid product remaining was measured on a solution of 0.1 gram of the polymer in 100 ml. of tetrahydrofuran at 25° C. and was found to be 0.59.

Following the procedure described in U.S. Patent No. 2,953,818, an organosol was prepared containing 1.3% by weight of the homopolymer of 2-hydroxy-4-methacryloxybenzophenone, based on the weight of polyvinyl fluoride, in a mixture containing 40% polyvinyl fluoride in N,N-dimethylacetamide. The organosol was extruded through a slotted casting hopper maintained at approximately 50° C. into a water bath maintained at 15° C. The quenched film was heated to 150° C. for 15 minutes to evaporate the solvent, then biaxially oriented following the procedures described in U.S. application Serial No. 801,441 filed on March 24, 1959, in the names of R. S. Prengle and R. L. Richards, Jr., and assigned to the assignee of the present application.

The same procedure was used to prepare polyvinyl fluoride films containing 3% and 5% of the homopolymer of 2-hydroxy-4-methacryloxybenzophenone.

The polyvinyl fluoride films containing the homopolymer of 2-hydroxy-4-methacryloxybenzophenone were tested by first forming laminar structures. The films were first treated to improve adherability of the surface by passing them through a stainless steel-lined treating chamber containing a gaseous mixture consisting of 50% boron trifluoride maintained at a temperature of 50° C. for 15 seconds followed by washing in an ammonium hydroxide solution followed by a water wash and drying in air. A 4-inch by 6-inch piece of each film was placed on a flat glass plate and a dam formed around its four edges with a length of 1/16 inch diameter twine. A degassed blend of a polyester formulation consisting of: 170 parts of a mixture of about 30% by weight of styrene and about 70% by weight of an unsaturated polyester formed by reacting a slight stoichiometric excess of propylene glycol with a mixture consisting of about 60 mole percent of phthalic anhydride and about 40 mole percent of maleic anhydride; 30 parts of methyl methacrylate; 1 part of benzoyl peroxide; 1.2 parts of methyl ethyl ketone hydroperoxide solution (60% solution of methyl ethyl ketone hydroperoxide in dimethyl phthalate); and 0.2 part of a solution consisting of about 6 parts by weight of cobalt naphthenates and about 51 parts by weight of naphthenic acids dissolved in about 43 parts by weight of mineral spirits, was poured onto the polyvinyl fluoride film and allowed to flow and spread evenly over the area bounded by the twine. Next, a 4-inch by 6-inch piece of chopped strand fiberglass mat (2 oz./sq. ft.) weighing approximately 9 grams was placed in the polyester polymerizable monomer layer. When the resin mixture had welled up through the interstices of the mat, a second 4-inch by 6-inch piece of the film of the polyvinyl fluoride-2-hydroxy-4-methacryloxybenzophenone polymer blend was placed on top, followed by another fiberglass plate and sufficient extra weight to establish a pressure of 0.6 oz./sq. in. over the 4-inch by 6-inch area. The entire sandwich was then placed in an oven and heated at 100° C. for one-half hour followed by ten minutes at 150° C. The resulting panel in each case exhibited unbroken surfaces of the polymer blend film over a substrate of the cured polyester.

Laminates made from one-mil thick films containing 1.3, 3.0 and 5%, respectively, of the homopolymer of 2-hydroxy-4-methacryloxybenzophenone showed no evidence of delamination after exposure in an Atlas Weather-o-meter[4] for 2000 hours. In contrast, a similar laminate made with a polyvinyl fluoride film containing no homopolymer of 2-hydroxy-4-methacryloxy-benzophenone showed delamination at 1000 hours.

In another test, the permanence of the blend of the homopolymer and polyvinyl fluoride was assessed. It was found that the polyvinyl fluoride film containing 3% of the homopolymer of 2-hydroxy-4-methacryloxybenzophenone at the outset still contained 3% of the polymer after preparation of the laminate. In contrast, a one-mil thick polyvinyl fluoride film containing 2-hydroxy-4-decyloxybenzophenone retained only 27% of the original amount in going through the lamination and curing cycle in preparing the laminate.

In still another test, polyvinyl fluoride films containing the homopolymer of 2-hydroxy-4-methacryloxybenzophenone showed substantially no extraction or loss of the homopolymer after boiling in methyl ethyl ketone.

---
[4] Atlas Sunshine Arc Weathero-Meter Model XW-R wherein the sample is subjected to a complex environment which includes heat, ultraviolet light, visible light, and moisture.

Examples 21–23

For Example 21, the homopolymer of 2-hydroxy-4-methacryloxyacetophenone was prepared as described for Example 10 and 11. For Examples 22 and 23, the homopolymer of 2-hydroxy-4'-methacryloxybenzophenone and the homopolymer of 2-hydroxy-4-methacryloxy-5-t-butylbenzophenone, respectively, were prepared as described for Examples 12–16.

Polyvinyl fluoride films containing 1.2% of these three homopolymers were prepared following the procedure given in Example 20. Orientation was carried out and laminates were prepared as described in Example 20. The three laminates were exposed in the Atlas Weather-o-meter. In each example, the laminates made with the polyvinyl fluoride films containing the homopolymers showed no evidence of delamination after exposure for 2000 hours. As shown in Example 20, a control laminate made with a polyvinyl fluoride film without any phenone homopolymer showed delamination at 1000 hours.

One of the most surprising aspects of the present invention lies in the preparation of the polymerizable light-stabilizing monomer. It should be noted that the starting material is an aromatic compound having substituted thereon two hydroxyl groups, one of which is ortho to a carbonyl group. It is believed that this hydroxyl group ortho to the carbonyl group provides the ultraviolet light stabilizing qualities of the compound. When this compound is converted to the acrylic ester or to the alkyl-substituted acrylic ester, it is unexpectedly found that it is the other hydroxyl group (not the hydroxyl group ortho to the carbonyl group) that apparently reacts exclusively. Thus, the resulting monomer retains its ultraviolet light resistant qualities.

It is also interesting to note that despite the harshness of the polymerization process from the standpoint of temperature and pressure, the aforementioned ortho-hydroxyl group is not destroyed nor even affected adversely. It is of further interest that the chelated hydroxyl group does not appear to inhibit polymerization; this is indeed surprising inasmuch as phenolic compounds such as tertiary butylphenol, hydroquinone, tertiary butyl catechol and the like have long been established as agents which can be added to monomeric systems to inhibit polymerization. The final homopolymer contains this hydroxyl group in pendant groups attached to the polymeric chain to provide the long-lasting weather-resistant properties in the polymeric structures.

The homopolymers alone or in combination with other materials either as a coating or in a blend provide ultraviolet light resistant structures. These structures, e.g. self-supporting films, supported films (laminates and coatings), filaments, tubing, etc., will find utility in the preparation of greenhouses, exterior screening, garden hose, as part of automobile exteriors, etc. As a coating, the homopolymers offer the particular advantage that the light absorber may be concentrated where it is most needed, on the surface of the degradable shaped article.

Having fully disclosed the invention, what is claimed is:

1. A weather-resistant shaped article which comprises a blend of a polymer selected from the group consisting of polyesters and epoxy resins and polymers of unsaturated compounds having the structural formula:

wherein $R_5$ is selected from the group consisting of hydrogen, halogen and alkyl having 1–4 carbon atoms, $R_6$ is selected from the group consisting of hydrogen, halogen, alkyl of 1–4 carbon atoms, carboalkoxy, phenyl, acetoxy, carboaryloxy, acetyl and cyano with 0.5–20% by weight of a homopolymer of an unsaturated compound selected from the group consisting of:

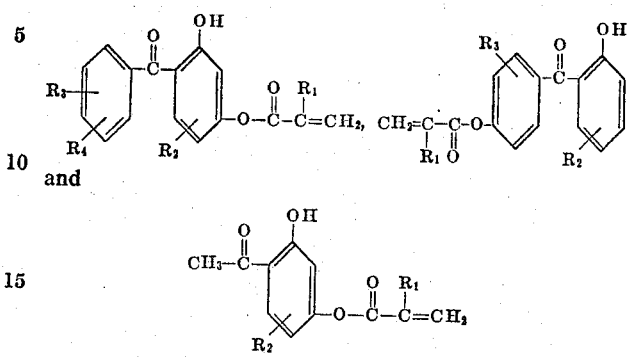

and wherein $R_1$ is selected from the group consisting of hydrogen and alkyl having 1–3 carbon atoms, and $R_2$, $R_3$ and $R_4$ are each selected from the group consisting of hydrogen, halogen, alkyl and alkoxy.

2. A weather-resistant shaped article as in claim 1 wherein said homopolymer is the homopolymer of 2-hydroxy-4-methacryloxybenzophenone.

3. A weather-resistant shaped article as in claim 1 wherein said homopolymer is the homopolymer of 2-hydroxy-4-acryloxybenzophenone.

4. A weather-resistant shaped article as in claim 1 wherein said homopolymer is the homopolymer of 2-hydroxy-4-methacryloxyacetophenone.

5. A weather-resistant shaped article as in claim 1 wherein said homopolymer is the homopolymer of 2-hydroxy-4-acryloxyacetophenone.

6. A weather-resistant shaped article as in claim 1 wherein said homopolymer is the homopolymer of 2-hydroxy-4'-methacryloxybenzophenone.

7. A weather-resistant shaped article as in claim 1 wherein said homopolymer is the homopolymer of 2-hydroxy-4'-acryloxybenzophenone.

8. A weather-resistant shaped article as in claim 1 wherein said homopolymer is the homopolymer of 2-hydroxy-4-methacryloxy-5-tertiary-butylbenzophenone.

9. A weather-resistant shaped article as in claim 1 wherein said homopolymer is the homopolymer of 2-hydroxy-4-methacryloxy-2',4'-dichlorobenzophenone.

10. A weather-resistant shaped article as in claim 1 wherein said polymer is polyethylene.

11. A weather-resistant shaped article as in claim 1 wherein said polymer is polyvinyl chloride.

12. A weather-resistant shaped article as in claim 1 wherein said polymer is a copolymer of ethylene and vinyl acetate.

13. A weather-resistant shaped article as in claim 1 wherein said polymer is polyvinylidene chloride.

14. A weather-resistant shaped article as in claim 1 wherein said polymer is polypropylene.

15. A weather-resistant shaped article as in claim 1 wherein said polymer is polybutyl acrylate.

16. A weather-resistant shaped article as in claim 1 wherein said polymer is polystyrene.

17. A weather-resistant shaped article as in claim 1 wherein said polymer is polyvinyl fluoride.

18. A weather-resistant self-supporting film which comprises a blend of a polymer selected from the group consisting of polyesters and epoxy resins and polymers of unsaturated compounds having the structural formula:

wherein

R$_5$ is selected from the group consisting of hydrogen, halogen and alkyl having 1-4 carbon atoms, R$_6$ is selected from the group consisting of hydrogen, halogen, alkyl of 1-4 carbon atoms, carboalkoxy, phenyl, acetoxy, carboaryloxy, acetyl and cyano with 0.5-20% by weight of the homopolymer of an unsaturated compound selected from the group consisting of:

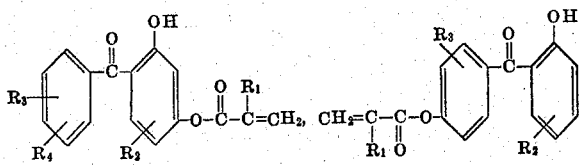

and

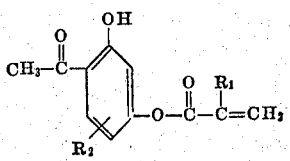

wherein

R$_1$ is selected from the group consisting of hydrogen and alkyl having 1-3 carbon atoms, and R$_2$, R$_3$ and R$_4$ are each selected from the group consisting of hydrogen, halogen, alkyl and alkoxy.

19. A weather-resistant self-supporting film which comprises a blend of polyvinyl fluoride with 0.5-20% by weight of the homopolymer of 2-hydroxy-4-methacryloxybenzophenone.

20. A weather-resistant self-supporting film which comprises a blend of polyvinyl fluoride with 0.5-20% by weight of the homopolymer of 2-hydroxy-4-methacryloxyacetophenone.

21. A weather-resistant self-supporting film which comprises a blend of polyvinyl fluoride with 0.5-20% by weight of the homopolymer of 2-hydroxy-4'-methacryloxybenzophenone.

22. A weather-resistant self-supporting film which comprises a blend of polyvinyl fluoride with 0.5-20% by weight of the homopolymer of 2-hydroxy-4-methacryloxy-5-tertiarybutylbenzophenone.

References Cited by the Examiner

UNITED STATES PATENTS 2,938,883   5/1960   Raich _____ 260—47

MURRAY TILLMAN, *Primary Examiner.*

LEON J. BERCOVITZ, *Examiner.*

J. A. KOLASCH, P. LIEBERMAN, *Assistant Examiners.*